United States Patent
Shepherd et al.

(10) Patent No.: US 11,461,411 B2
(45) Date of Patent: Oct. 4, 2022

(54) SYSTEM AND METHOD FOR PARSING VISUAL INFORMATION TO EXTRACT DATA ELEMENTS FROM RANDOMLY FORMATTED DIGITAL DOCUMENTS

(71) Applicant: DELL PRODUCTS, LP, Round Rock, TX (US)

(72) Inventors: Michael Shepherd, Leander, TX (US); Saurabh Jha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 16/890,159

(22) Filed: Jun. 2, 2020

(65) Prior Publication Data
US 2021/0374190 A1  Dec. 2, 2021

(51) Int. Cl.
*G06F 16/93* (2019.01)
*G06N 3/08* (2006.01)

(52) U.S. Cl.
CPC ............... *G06F 16/93* (2019.01); *G06N 3/08* (2013.01)

(58) Field of Classification Search
CPC ........ G06F 16/93; G06F 16/26; G06F 40/279; G06N 3/08; G06N 3/0454; G06N 20/00; G06N 3/02; G06K 9/6232; G06K 9/00536; G06K 9/623; G06K 9/629; G06V 10/82; G06V 30/10; G06V 30/413

USPC .......................................................... 707/758
See application file for complete search history.

(56) References Cited

U.S. PATENT DOCUMENTS

| | | | |
|---|---|---|---|
| 10,482,118 B2 | 11/2019 | Zheng | |
| 10,872,236 B1* | 12/2020 | Elor | G06K 9/6223 |
| 2019/0065991 A1 | 2/2019 | Guggilla et al. | |
| 2021/0012102 A1* | 1/2021 | Cristescu | G06V 30/412 |
| 2021/0216862 A1* | 7/2021 | Liu | G06N 3/0454 |

\* cited by examiner

*Primary Examiner* — Evan Aspinwall
(74) *Attorney, Agent, or Firm* — Larson Newman, LLP

(57) ABSTRACT

An information handling system is provided for extracting data associated with a data field of a database from a randomly formatted source document. A processor of the information handling system receives the document, embeds a text-based representation of text of the document into vector data associated with the text, and encodes the vector data through a first neural network into reconstructed text activations. The processor further concatenates the vector data with an image-based representation of the document to provide first concatenated data, and encodes the first concatenated data through a second neural network into extracted visual feature activations. The processor further concatenates the reconstructed text activations with the extracted visual feature activations to provide second concatenated data, decodes the second concatenated data to identify particular data associated with the data field, and updates an entry of the database with the particular data in the data field.

18 Claims, 3 Drawing Sheets

SYSTEM AND METHOD FOR PARSING VISUAL INFORMATION TO EXTRACT DATA ELEMENTS FROM RANDOMLY FORMATTED DIGITAL DOCUMENTS

FIELD OF THE DISCLOSURE

This disclosure generally relates to information handling systems, and more particularly relates to parsing visual information to extract data elements from randomly formatted digital documents in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may be provided for extracting data associated with a data field of a database from a randomly formatted source document. A processor of the information handling system may receive the document, embed a text-based representation of text of the document into vector data associated with the text, and encode the vector data through a first neural network into reconstructed text activations. The processor may further concatenate the vector data with an image-based representation of the document to provide first concatenated data, and encode the first concatenated data through a second neural network into extracted visual feature activations. The processor may further concatenate the reconstructed text activations with the extracted visual feature activations to provide second concatenated data, decode the second concatenated data to identify particular data associated with the data field, and update an entry of the database with the particular data in the data field.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
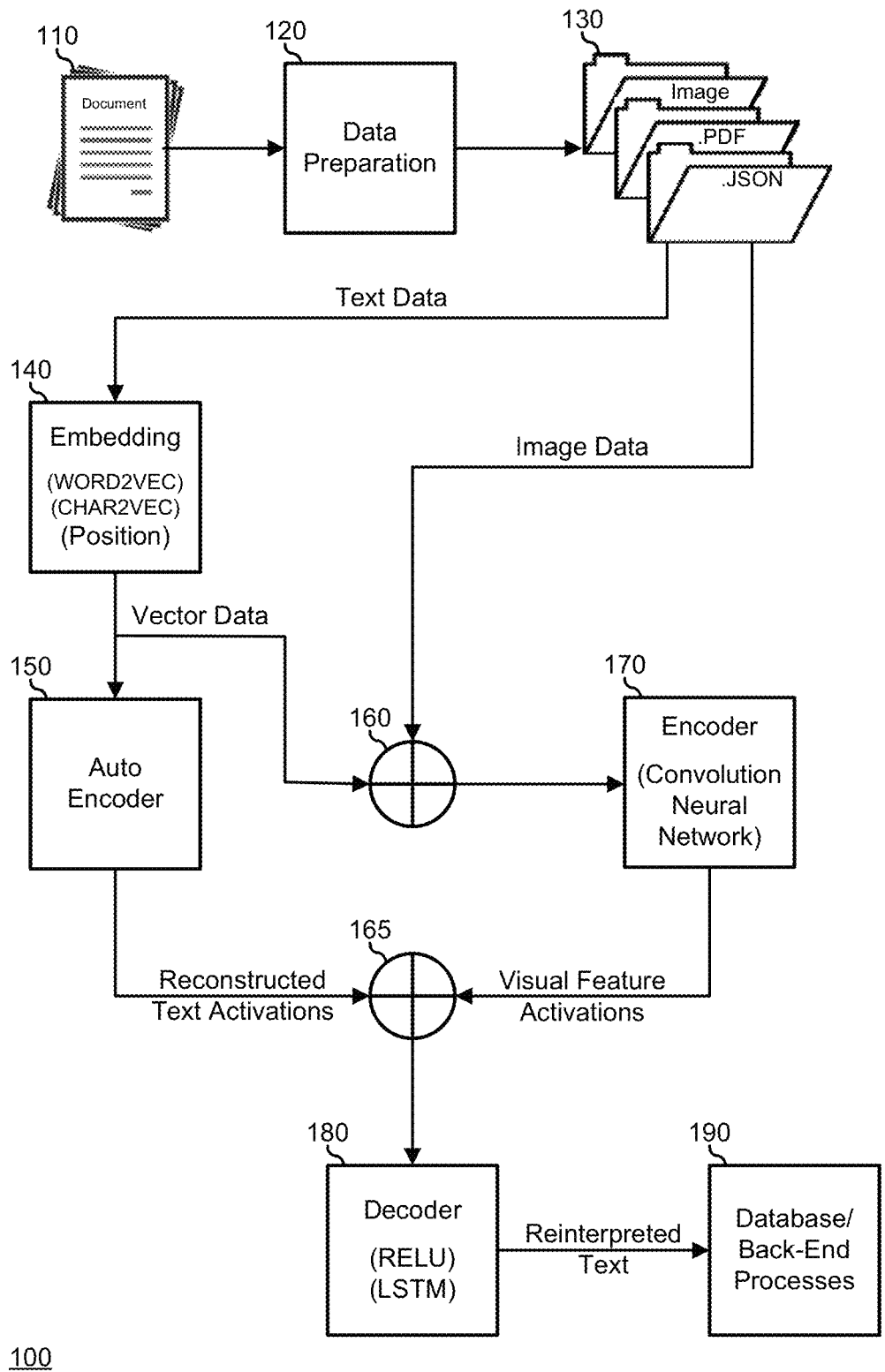
FIG. 1 is a block diagram illustrating an information extraction system according to an embodiment of the present disclosure.

FIG. 1 illustrates an information extraction system 100 that operates to extract structured information from unstructured digital documents. For the purposes of illustration, information extraction system 100 will be described with reference to an invoice processing system, but this is not necessarily so, and other exemplary uses of an information extraction system may be contemplated within the teachings of the present disclosure. For example, other uses of information extraction system 100 may include operations in an order processing system, a medical procedure processing system, a pharmaceutical processing system, or another type of business or non-business system, as needed or desired. In general, any type of processing system that receives widely varying visual input information and that needs to extract meaningful data therefrom, may benefit from the teachings of the present disclosure.

In the context of an invoice processing system, invoices are received and various back-end processes are performed against the received invoices, including invoice verification and validation, account management, payment scheduling, payment verification and validation, dispute arbitration, and the like. Here, because businesses typically receive invoices from a wide variety of vendors, suppliers, service providers, and the like, it is often the case that the received invoices come in a myriad of formats. For example, the received invoices can be hard copy documents, or electronic file documents. Where the invoices are electronic file documents, the electronic documents can be provided in any one of a number of file formats, including Adobe Acrobat documents (.pdf), Word documents (.docx), Excel spreadsheets (.xlsx), Power Point presentations (.pptx), text (.txt) or rich text format (.rtf) documents, Hyper-Text Markup Language (HTML) documents, e-book file format documents (.epub), or other formats of electronic documents, as needed or desired. Here, it will be understood that the business or entity that employs information extraction system 100 may have little or no control over the file format in which electronic file documents are received. On the other hand, where the invoices are hard copy documents, the hard copy documents can be scanned into a desired one of the file formats as described above.

Moreover, even when the file format of the documents received may be restricted to a small number of file formats, the content of the received documents may be presented in a myriad of content formats. For example, continuing with invoices, the location of the address block for the invoice sender may be at the top, in the middle, or at the bottom of the invoice, as may be desired by the invoice sender, and the invoice information may be correspondingly located opposite from the address block. Further, an invoice may include other information such as a corporate logo or slogan, other invoice information such as addressee information, invoice number, order number, or other information unique to the invoice, advertisement information, or other information not directly related to the intent of invoice to communicate billing information.

A typical approach to determining the relevant information from a large number or received documents is to manually input the information based upon a human reading of the document to identify the relevant information, and the entry of the relevant information into a common database for post-processing. Here, the database may include multiple data fields that need to be filled in for each invoice. An example of such data fields may include an invoicing entity field, one or more invoicing entity address field, an invoice number field, one or more line item number fields and associated line item description fields and dollar fields, and the like. Such a manual input approach is laborious and error prone, and may not be scalable as the number of received documents increases. Another approach may be to provide a vision system with a limited number of templates that each represent a larger number of content formats, such as a template for invoice information to be at the bottom of a page, in a lower-right-hand corner of the document, and another template for information to be at a top of a page in a top-right-hand corner of the document. Such a vision system can then scan each document against the known templates and determine the invoice information based upon the templates, and can enter the determined information into the data fields. However, such an approach lacks flexibility, in that any newly received document that differs from the expected templates must be handled manually, as described above, and also necessitates the creation of a new template to handle the exception.

Information extraction system 100 operates to extract meaningful data from input documents of widely varying file formats and content formats utilizing machine learning techniques such as word and character embedding models to map identified words and characters in the source documents to vector space to identify the relatedness of the information included in the source documents, encoding neural networks to encode the visual information within the source documents, and decoding neural networks to extract the desired textual information and to parse the desired textual information into useable database information, that is, into information to fill the data fields of a database. Information extraction system 100 includes source documents 110, a data preparation unit 120 that pre-processes the source documents into various folders 130, an embedding unit 140, an auto-encoder unit 150, concatenators 160 and 165, an encoder unit 170, a decoder unit 180, and a database/backend processing unit 190. Documents 110 represent the input information to information extraction system 100, such as the documents of the various types as described above. Documents 110 may include input information derived from hard copy documents and that have been scanned or otherwise had the information content therein digitized. Documents 110 are received by data preparation unit 120 and processed into folders 130 associated with each document.

Figure 2:
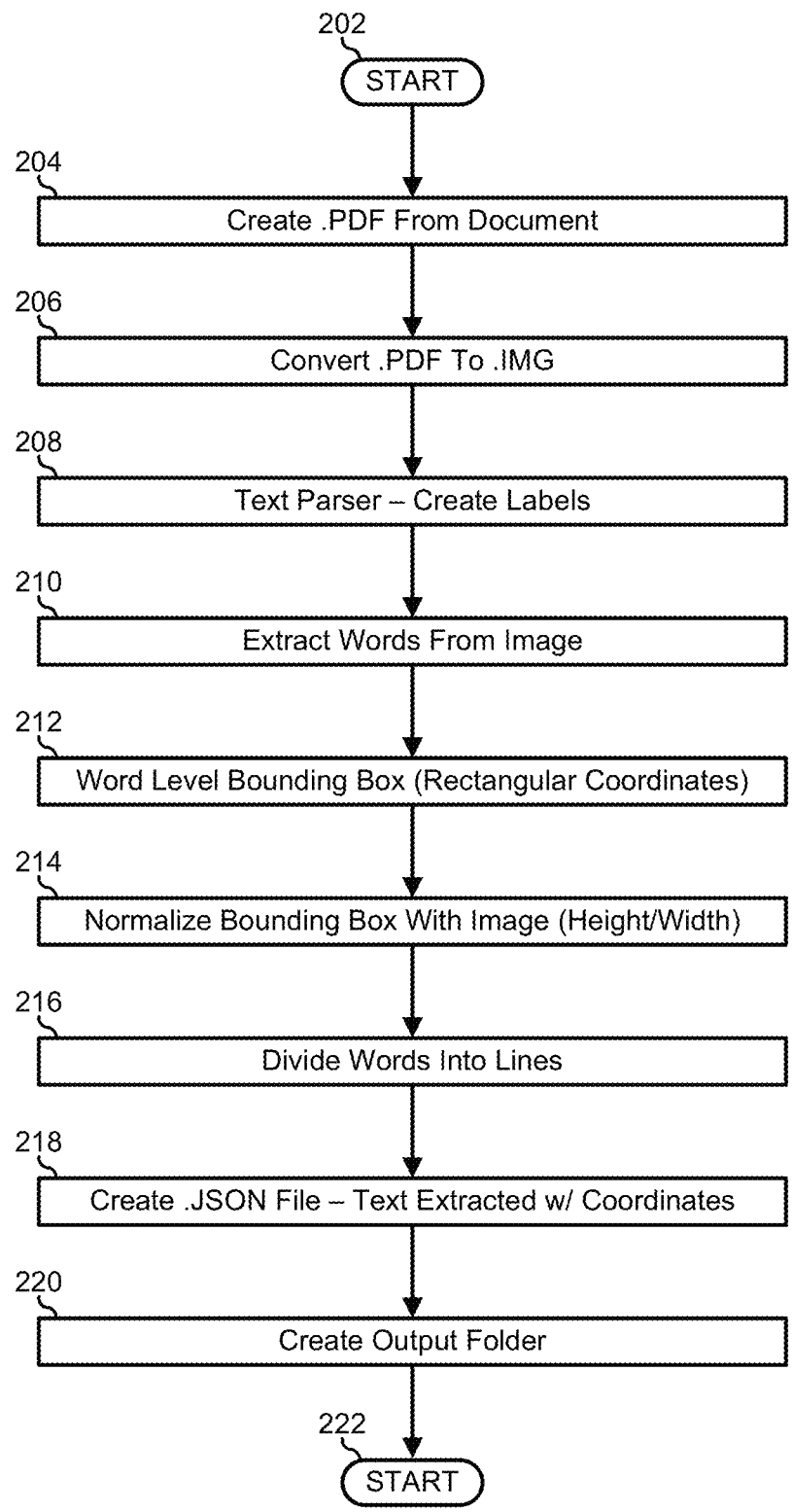
FIG. 2 is a flow chart illustrating a method of preparing documents for use in the information extraction system of FIG. 1.

FIG. 2 illustrates the steps taken by data preparation unit 110, starting at block 202. Each document in converted to a single consistent file format for text information in block 204. For example, each document can be converted to a readable text Adobe Acrobat file (.pdf). The text formatted files are converted to a single consistent file format for visual information in block 206. The text file is parsed into in block 208. For example, the Adobe Acrobat file can be processes by an optical character recognition (OCR) process to extract a word level bounding box for each word identified in the text file. Here, each document can be described as a set "P," where P={(w1, p1), (w2, p2) . . . (wp, pp)} where w is the text and p indicates a position of the text, represented as (x, y, h, w), where x and y are location coordinates on a plane, and h and w represent the height and width of the text. After parsing the text file, words are extracted in block 210, and the words are parsed into bounding boxes in block 212. The work level bounding boxes are normalized to standard heights and widths, and the words are stored in a dictionary in block 214. The words are divided into lines in block 216. For example, the words can be divided into non-intersecting lines and sorted by their horizontal position inside each line. In a particular embodiment, if a difference between the y-coordinate of a current word and a previous word is more than 0.5% of the word height, the word is deemed to be in a next line. If the difference between the x-coordinate of the current word and the previous word is more than 5% of the width, the word is considered to be in different line. The word list is utilized to create a Java Script Object Notation (.json) file in block 218, output folders 130 are created in block 220, and the processing by data preparation unit 110 is completed in block 222.

The text data from folders 130 are provided to embedding unit 140. Embedding unit 140 operates to quantify and categorize semantic similarities between the words of documents 110 based upon distributional properties of the words in the documents. In particular, embedding refers to the process of mapping the characters, words, and phrases of documents 110 to vectors of real numbers, and involves the mathematical embedding of the characters, words, and phrases from many dimensional space associated with the characters, words, and phrases into a continuous vector spaces with much lower numbers of spaces. In a particular embodiment, embedding unit 140 employs word-to-vector (Word2Vec) models, shallow two-layer neural networks that are pre-trained to reconstruct linguistic contexts to the words of documents 110. Moreover, as the number of documents processed increases, the modeling will become better trained to the types of words and phrases that occur in the target group of documents. For example, words that are typically utilized in invoices, continuing with the previous examples, will become more readily recognized and mapped as the number of invoices processed increases. In another embodiment, embedding unit 140 employs character-to-vector (Char2Vec) models to that are pre-trained to linguistic contexts of the words of documents 110 on the character level. For example, while a typical Word2Vec model may ascribe similar words with different meanings as being related (e.g., "gab" and "bag"), a typical Char2Vec model may better distinguish similar words as having different meanings. In another embodiment, embedding unit 140 employs both Word2Vec and Char2Vec models, and concatenates the results for further processing. It will be understood that other embeddings may be utilized. For example, embedding unit 140 may further employ various position embeddings, as needed or desired.

The vector data from embedding unit 140 is provided to auto-encoder unit 150 to reconstruct the text from the vector data. Here, auto-encoder unit 150 may utilize a neural network to learn the representation of documents 110 to attempt to recreate the text in each document. In a typical information extraction system of the prior art, vector data from an embedding unit similar to embedding unit 140 is provided to an auto-encoder unit similar to auto-encoder unit 150, and the activations from the reconstructed text from the auto-encoder unit is concatenated with the activations of the visual features, as described further, below, and provided to a decoder unit to parse and extract the target information from the source documents. In this regard, auto-encoder 150 operates similarly to auto-encoders of the prior art. As such, the details of providing an auto-encoder unit, including the types of neural networks, training sequences, and other details of encoding, are known in the art, and will not be further described herein, except as needed to illustrate the current embodiments.

Where information extraction system 100 differs from the typical information extraction system of the prior art is in the parallel encoding process provided by concatenators 160 and 165, encoder unit 170, and the decoding by decoder 180 of concentrated streams from auto-encoder unit 150 and encoder unit 170, as described hereinafter. Here, the vector data from embedding unit 140 is concatenated with the image data from files 130 by concatenator 160, and the concatenated data is provided to encoder unit 170 to extract the visual features from the concatenated data. In a particular embodiment, encoder unit 170 represents a dilated convolution block, a convolution neural network (CNN) that consists of a number of dilated convolution operations, each with a different dilation rate. Dilation convolution allows the CNN to capture local and global features by increasing the dilation rate. Here, the CNN takes advantage of hierarchical patterns in the documents (e.g., the tabular nature of many invoices) to assess more complex patterns based upon simpler patterns. In this way, the pre-processing needs of the CNN is less than with other neural network models. Here, the CNN is utilized to understand the visual context of documents 110, such as the physical features (e.g., font size, shape, color, etc.) and the spatial location of the text. An example of a CNN may include a pre-trained off-the-shelf architecture, such as a Residual Network (ResNet) product, a CNN that includes three dilated convolution blocks, each with 3×3 filters used where the dilation rate is increased (e.g., 1, 2, 4) for each block, or another CNN suitable to extract visual features from the concatenated streams from an auto-encoder, as needed or desired. Here, deeper layer functionality can be disabled, keeping only the convolutional base layers intact, and training and finetuning the remaining layers as needed or desired.

The reconstructed text activations from documents 110 from auto-encoder unit 150 are concatenated with the extracted visual feature activations from the documents from encoder unit 170 by concatenator 165, and the concatenated data is provided to decoder unit 180 to extract the features of interest from documents 110 (e.g., invoice line items, dollar amounts, etc.). In a particular embodiment, decoder unit 180 includes two dense layers of 500 rectified linear units (ReLUs), followed by a single layer of 300 bi-directional Long Short-Term Memory (LSTM) units, and followed by two additional dense layers of 500 ReLUs. In a particular embodiment, decoder unit 180 utilizes a Connectionist Temporal Classification (CTC) output for scoring and training the decoder unit.

The reinterpreted textual information from documents 110 from decoder unit 180 is provided to database/back-end processing unit 190 for inputting into the appropriate data fields of the database of the identified information from the documents. For example, where information extraction system 100 represents an invoice processing system, the identified information may include information for an invoicing entity field, one or more invoicing entity address field, an invoice number field, one or more line item number fields and associated line item description fields and dollar fields, and other information, as needed or desired. Database/back-end processing unit 190 further represents processing systems for consuming the desired information. For example, where information extraction system 100 represents an invoice processing system, database/back-end processing unit 190 can include functionality to verify and validate the invoices, manage accounts, schedule payments, verify and validate payments, arbitrate disputes, and the like, as needed or desired.

In a particular embodiment, one or more of data preparation unit 120, embedding unit 140, auto-encoder unit 150, concatenators 160 and 165, encoder unit 170, decoder unit 180, and database/back-end processing unit 190 represent one or more information handling systems or a portion of an information handling system, as needed or desired. In particular, where one or more of data preparation unit 120, embedding unit 140, auto-encoder unit 150, concatenators 160 and 165, encoder unit 170, decoder unit 180, and database/back-end processing unit 190 includes various functions for machine learning, such as neural networks, CNNs, OCR, ReLUs, LSTMs, CTCs, or the like, it will be understood that various specialty processing elements, such as Single Instruction Multiple Data (SIMD) processors like Graphics Processing Units (GPUs), Field Programmable Gate Arrays (FPGAs), and the like, co-processors, or other specialty processing elements may be utilized to provide the processing functionality of the information handling systems that make up information extraction system 100, as needed or desired. In another embodiment, one or more of data preparation unit 120, embedding unit 140, auto-encoder unit 150, concatenators 160 and 165, encoder unit 170, decoder unit 180, and database/back-end processing unit 190 is implemented in software running on an information handling system, as needed or desired. In another embodiment, one or more of data preparation unit 120, embedding unit 140, auto-encoder unit 150, concatenators 160 and 165, encoder unit 170, decoder unit 180, and database/back-end processing unit 190 is implemented as a combination of information handling systems with specialty processing elements and software operating on information handling systems, as needed or desired. In yet another embodiment, one or more of data preparation unit 120, embedding unit 140, auto-encoder unit 150, concatenators 160 and 165, encoder unit 170, decoder unit 180, and database/back-end processing unit 190 is implemented utilizing Application Specific Integrated Circuits (ASICs) that are specifically designed to perform the requisite functions, and such ASICs may be integrated onto one or more System-On-A-Chip (SOC), as needed or desired.

Figure 3:
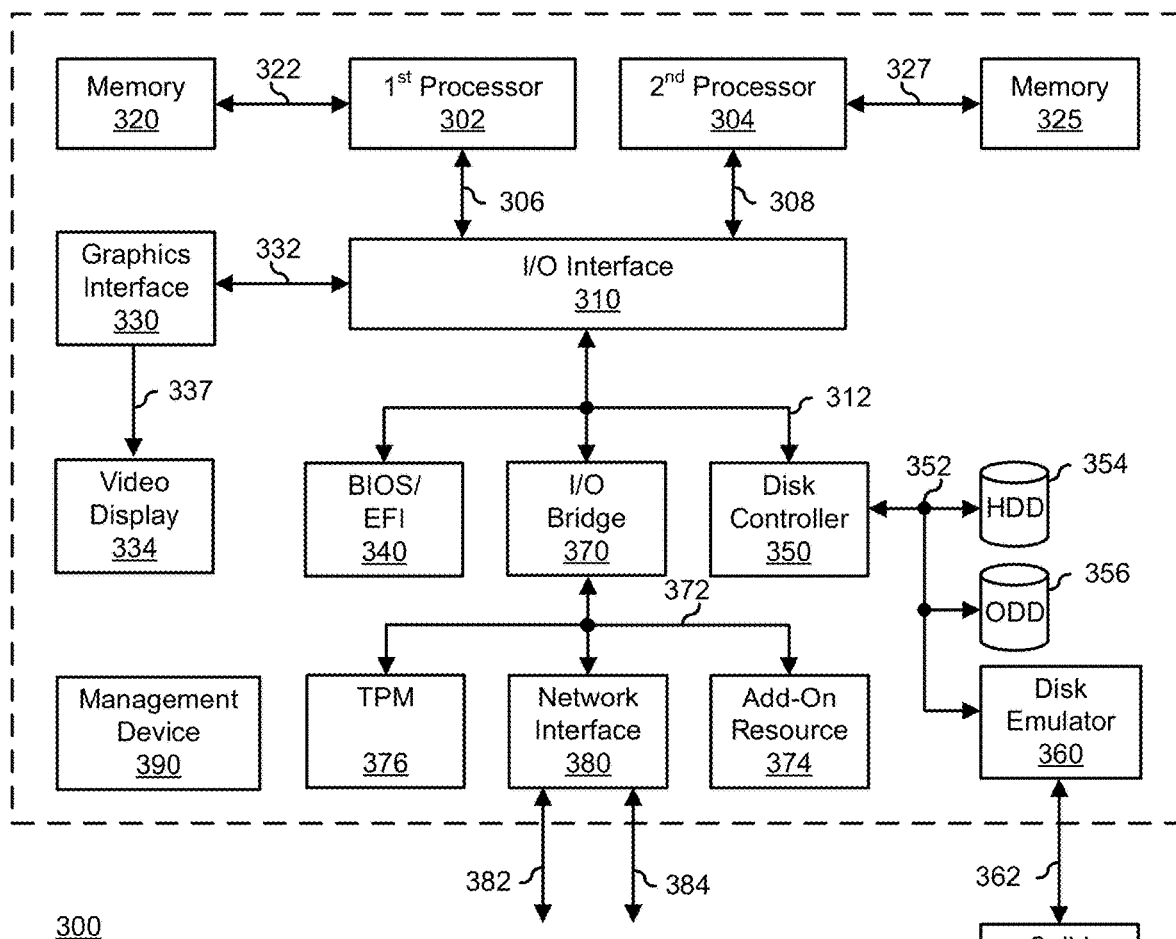
FIG. 3 is a block diagram illustrating a generalized information handling system according to another embodiment of the present disclosure.

FIG. 3 illustrates a generalized embodiment of an information handling system 300 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system for extracting data associated with a data field of a database from a randomly formatted source document, the information handling system comprising:
a memory; and
a processor in communication with the memory and configured to:
receive the document;
embed a text-based representation of text of the document into vector data associated with the text;
in parallel operations:
encode the vector data through a first neural network into reconstructed text activations; and
concatenate the vector data with an image-based representation of the document to provide first concatenated data, and encode the first concatenated data through a second neural network into extracted visual feature activations, wherein the second neural network comprises a dilated convolution neural network;
concatenate the reconstructed text activations with the extracted visual feature activations to provide second concatenated data;
decode the second concatenated data to identify particular data associated with the data field; and
update an entry of the database with the particular data in the data field.

2. The information handling system of claim 1, wherein:
the document is received in a first file format; and
the processor is further configured to convert the document from the first file format to a second file format, wherein the first file format is different from the second file format, and wherein the second file format includes the text-based representation.

3. The information handling system of claim 2, wherein the processor is further configured to convert the document from the first file format to a third file format, wherein the first and second file formats are different from the third file format, and wherein the third file format includes the image-based representation.

4. The information handling system of claim 1, wherein in embedding the text-based representation, the processor utilizes a word-to-vector embedding model.

5. The information handling system of claim 4, wherein in embedding the text-based representation, the processor further utilizes a character-to-vector embedding model.

6. The information handling system of claim 1, wherein in decoding the second concatenated data, the processor utilizes two dense layers of rectified linear units (ReLUs), followed by a single layer of bi-directional Long Short-Term Memory (LSTM) units, and followed by two additional dense layers of ReLUs.

7. The information handling system of claim 6, wherein each dense layer of ReLUs includes at least five hundred layers.

8. The information handling system of claim 7, wherein the dense layer of LSTM units includes at least three hundred layers.

9. The information handling system of claim 1, wherein:
the information handling system represents an invoice processing system; and
the particular data includes at least one of invoicing entity, an invoicing entity address, an invoice number, a line item number, a line item description, and a price.

10. A method for extracting data associated with a data field of a database from a randomly formatted source document, method comprising:
receiving, by a hardware processor, the document;
embedding a text-based representation of text of the document into vector data associated with the text;
in parallel operations:
encoding the vector data through a first neural network into reconstructed text activations; and
concatenating the vector data with an image-based representation of the document to provide first concatenated data, and encoding the first concatenated data through a second neural network into extracted visual feature activations, wherein the second neural network comprises a dilated convolution neural network;
concatenating the reconstructed text activations with the extracted visual feature activations to provide second concatenated data;
decoding the second concatenated data to identify particular data associated with the data field; and
updating an entry of the database with the particular data in the data field.

11. The method of claim 10, wherein the document is received in a first file format, the method further comprising:
converting the document from the first file format to a second file format, wherein the first file format is different from the second file format, and wherein the second file format includes the text-based representation.

12. The method of claim 11, further comprising:
converting the document from the first file format to a third file format, wherein the first and second file formats are different from the third file format, and wherein the third file format includes the image-based representation.

13. The method of claim 10, wherein in embedding the text-based representation, the processor utilizes a word-to-vector embedding model.

14. The method of claim 13, wherein in embedding the text-based representation, the processor further utilizes a character-to-vector embedding model.

15. The method of claim 10, wherein in decoding the second concatenated data, the processor utilizes two dense layers of rectified linear units (ReLUs), followed by a single layer of bi-directional Long Short-Term Memory (LSTM) units, and followed by two additional dense layers of ReLUs.

16. The method of claim 15, wherein each dense layer of ReLUs includes at least five hundred layers, and the dense layer of LSTM units includes at least three hundred layers.

17. The method of claim 1, wherein the particular data includes at least one of invoicing entity, an invoicing entity address, an invoice number, a line item number, a line item description, and a price.

18. An invoice processing system for extracting data associated with a data field of a database from a randomly formatted source document, the system comprising:
a memory; and
a processor in communication with the memory and configured to:
receive the document;
embed a text-based representation of text of the document into vector data associated with the text;
in parallel operations:
encode the vector data into reconstructed text activations; and
concatenate the vector data with an image-based representation of the document to provide first concatenated data and encode the first concatenated data through a dilated convolution neural network into extracted visual feature activations;
concatenate the reconstructed text activations with the extracted visual feature activations to provide second concatenated data;
decode the second concatenated data to identify particular data associated with the data field, wherein the data field; and
update an entry of the database with the particular data in the particular data includes at least one of invoicing entity, an invoicing entity address, an invoice number, a line item number, a line item description, and a price.

* * * * *